FREQUENCY SHIFT TRANSMISSION SYSTEM

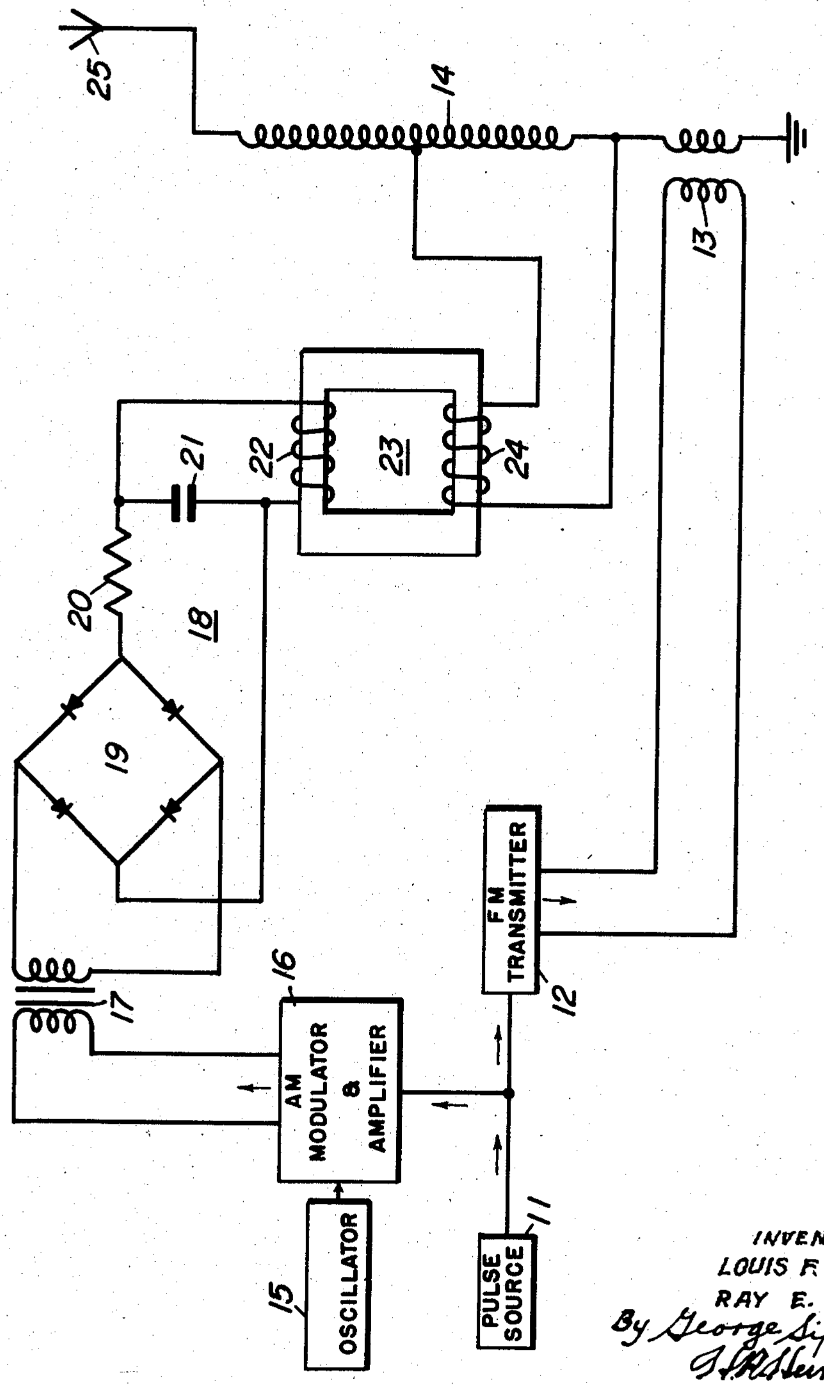
INVENTORS
LOUIS F. DEISE
RAY E. LEE
By George Sipkin
[signature]
ATTORNEYS 2,883,524

Louis F. Deise, Baltimore, and Ray E. Lee, Glen Burnie, Md., assignors to the United States of America as represented by the Secretary of the Navy Application June 15, 1953, Serial No. 361,538

1 Claim. (Cl. 250—17)

This invention relates to means for controlling an antenna and more particularly to means for automatically adjusting the resonant frequency of an antenna which radiates a radio signal.

Frequency shift keying in radio-telegraphy consists in changing the frequency of the transmitted signal upon the occurrence of a signal pulse. Thus, when a dot or a dash is to be transmitted, the carrier frequency is shifted from its normal frequency to another frequency. The second frequency is transmitted for the interval necessary to define a dot; for a dash, the interval is longer but the frequency is the same. It can readily be appreciated, that since one of two frequencies only is transmitted at a time, more efficient operation should be achieved if the resonant frequency of the antenna could be shifted to correspond to the frequency being transmitted at that instant.

It is an object of this invention to provide means for shifting the resonant frequency of an antenna.

Another obpect of this invention is to provide automatic means for changing the resonant frequency of a transmitting antenna to correspond to changes in the frequency of the transmitted signal.

Other objects and advantages of the invention will hereinafter become more fully apparent from the following description of the annexed drawing, which illustrates a preferred embodiment, and wherein the single figure of the drawing is a block diagram of a circuit embodying this invention.

Referring in detail to the drawing, a source of pulses 11 such as a teletypewriter has its output coupled to an FM (frequency modulation) transmitter 12 including a modulator (not shown), which is responsive to the pulses from pulse source 11 and determines which of two operating frequencies will be transmitted at any instant. The output of the transmitter 12 is coupled through an impedance matching transformer 13 to an antenna loading coil 14. An oscillator 15, which generates a wave of a frequency the same or different from that of the FM transmitter, is connected to an AM (amplitude modulation) modulator and amplifier 16. A portion of the output from the pulse source 11 is fed also into the AM modulator 16 and modulates the wave from the oscillator 15. An impedance matching transformer 17 is used to couple the AM modulator 16 to a detector 18 which comprises a full wave rectifier 19, a resistor 20, and a capacitor 21. A saturable-core reactor 23 has a control winding 22 which is fed from the output of the detector 18 and a second winding 24 which is connected in parallel with a portion of the antenna loading coil 14 to serve as a part of the impedance of an antenna 25.

In operation, the FM transmitter 12 transmits a signal of a predetermined frequency when no signal input is applied to it. Upon the generation of a pulse output from the pulse source 11, the transmitted signal of the transmitter 12 is shifted to a second predetermined frequency which is broadcast for the length of time that the pulse exists. At the same time, a portion of the output signal from the pulse source 11 is injected into the AM modulator 16 where it modulates the carrier wave from the oscillator 15. The modulated wave is transmitted through the impedance matching transformer 17 to the demodulator 18 where a replica of the original pulse is recovered. The recovered pulse is then fed into the control winding 22 of the saturable reactor 23 to vary the inductance of the reactor 23 and of the winding 24. Since the winding 24 is effectively a portion of the antenna circuit impedance, the tuning of the entire antenna circuit is varied by the generation of a pulse in the pulse source 11 and the resonant frequency of the antennna is shifted at the same time as and to correspond to the shift in the signal frequency of the FM transmitter 12.

The wave of suitable frequency generated by oscillator 15, when added to the output from pulse 11, and modulated by AM modulator and amplifier 16, provides a substantially square wave. However, in passing through transformer 17, the square wave becomes somewhat rounded, but is substantially reformed to its original squareness by demodulator 18 before passing to control winding 22.

The energy of the pulse output from the pulse source 11 must be amplified to a value sufficient to affect the inductance of the antenna circuit. Amplifiers have high output impedance and the control winding 22 has a low input impedance necessitating the use of an impedance matching transformer between the two. The modulator 16 and the demodulator 18 have been provided to allow the transmission of the original pulse through the transformer 17 with substantially no distortion.

Obviously many modifications and variations of the present invention are possible in the light of the above teachings. It is therefore to be understood that within the scope of the appended claim the invention may be practiced otherwise than as specifically described.

What is claimed is:

In a frequency shift transmission system having an antenna circuit with a loading coil, a pulse source, a transmitter including a modulator responsive to pulses from said pulse source for determining a frequency to be transmitted, an oscillator generating a wave of a frequency the same as or different from that transmitted by said transmitter, said oscillator and said pulse source feeding an AM modulator, amplifying means for the output of said AM modulator, a demodulator, an impedance matching transformer coupling the amplified output from the AM modulator with the demodulator, a saturable reactor having a control winding and a secondary winding, said control winding being connected to the demodulator and said secondary winding being connected to the loading coil of the antenna circuit in parallel therewith whereby the resonant frequency of the antenna circuit is shifted to equal the transmitted frequency of said transmitter.

References Cited in the file of this patent

UNITED STATES PATENTS

| | | |
|---|---|---|
| 1,642,173 | Round | Sept. 13, 1927 |
| 1,684,261 | Brown | Sept. 11, 1928 |
| 1,882,698 | Alexanderson | Oct. 18, 1932 |
| 2,211,010 | Hallmark | Aug. 13, 1940 |
| 2,376,667 | Cunningham et al. | May 22, 1945 |
| 2,379,897 | Floyd | July 10, 1945 |
| 2,480,820 | Hollingsworth | Aug. 30, 1949 |
| 2,653,223 | Musk et al. | Sept. 22, 1953 |
| 2,712,061 | McClellan | June 28, 1955 |